US010477591B2

(12) United States Patent
Jung et al.

(10) Patent No.: US 10,477,591 B2
(45) Date of Patent: Nov. 12, 2019

(54) RANDOM ACCESS PROCEDURE FOR BEAM BASED CELL-LESS OPERATION IN 5G RAT

(71) Applicant: INTEL IP CORPORATION, Santa Clara, CA (US)

(72) Inventors: Hyejung Jung, Palatine, IL (US); Honglei Miao, Munich (DE); Alexey Vladimirovich Davydov, Nizhny Novgorod (RU)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/751,676

(22) PCT Filed: Mar. 31, 2016

(86) PCT No.: PCT/US2016/025292
§ 371 (c)(1),
(2) Date: Feb. 9, 2018

(87) PCT Pub. No.: WO2017/044155
PCT Pub. Date: Mar. 16, 2017

(65) Prior Publication Data
US 2018/0235013 A1  Aug. 16, 2018

Related U.S. Application Data

(60) Provisional application No. 62/216,919, filed on Sep. 10, 2015.

(51) Int. Cl.
*H04W 74/08* (2009.01)
*H04W 16/28* (2009.01)
(Continued)

(52) U.S. Cl.
CPC ........ *H04W 74/0833* (2013.01); *H04B 7/088* (2013.01); *H04L 5/0053* (2013.01);
(Continued)

(58) Field of Classification Search
CPC .......... H04W 74/0833; H04W 72/044; H04W 52/50; H04W 74/006; H04W 16/28;
(Continued)

(56) References Cited

U.S. PATENT DOCUMENTS

2010/0302998 A1  12/2010  Bao
2011/0075636 A1*  3/2011  Blomgren ............. H04L 1/1822
                                                          370/336
(Continued)

FOREIGN PATENT DOCUMENTS

WO   WO-2015020394 A1 *  2/2015  ............ H04W 48/16
WO   WO 2015-113202 A1    8/2015

OTHER PUBLICATIONS

International Preliminary Report on Patentability received for PCT Patent Application No. PCT/US2016/025292, dated Mar. 22, 2018, 10 pages.

(Continued)

*Primary Examiner* — Curtis A Alia
(74) *Attorney, Agent, or Firm* — Womble Bond Dickinson (US) LLP

(57) ABSTRACT

A random access procedure is described for beam-based cell-less operations in fifth generation radio access technology. In one example a preamble transmission power, a preamble format, and a transmit timing are jointly determined at a user equipment (UE) for respective ones of one or more physical random access channel (PRACH) preamble transmissions. The determined preamble transmission powers, preamble formats, and transmit timing, multiple PRACH preamble transmissions are transmitted each to a target access point (AP). Based on the transmitted PRACH preamble transmissions, the UE the receives at least one random access response (RAR) message with an indication of timing advance (TA) values and beams of each target AP.

18 Claims, 9 Drawing Sheets

(51) Int. Cl.

| | | |
|---|---|---|
| *H04L 5/00* | (2006.01) | |
| *H04W 74/00* | (2009.01) | |
| *H04B 7/08* | (2006.01) | |
| *H04W 52/50* | (2009.01) | |
| *H04W 72/04* | (2009.01) | |
| *H04B 7/0413* | (2017.01) | |
| *H04W 88/06* | (2009.01) | |
| *H04W 88/08* | (2009.01) | |

(52) U.S. Cl.
CPC ........... *H04W 16/28* (2013.01); *H04W 52/50* (2013.01); *H04W 72/044* (2013.01); *H04W 74/006* (2013.01); *H04B 7/0413* (2013.01); *H04W 88/06* (2013.01); *H04W 88/08* (2013.01)

(58) Field of Classification Search
CPC ...... H04W 88/08; H04W 88/06; H04B 7/088; H04B 7/0413; H04L 5/0053
See application file for complete search history.

(56) References Cited

U.S. PATENT DOCUMENTS

| | | | |
|---|---|---|---|
| 2014/0023030 A1* | 1/2014 | Jeong | H04W 74/08 370/329 |
| 2014/0286261 A1* | 9/2014 | Vujcic | H04W 74/0833 370/329 |
| 2014/0293915 A1* | 10/2014 | Pelletier | H04W 74/002 370/329 |
| 2015/0173028 A1 | 6/2015 | Dinan | |
| 2015/0181595 A1 | 6/2015 | Li | |
| 2016/0192278 A1* | 6/2016 | Ji | H04W 48/16 370/329 |

OTHER PUBLICATIONS

Korean IP Office, International Search Report of the International Searching Authority, dated Jul. 1, 2016 for International Application No. PCT/US16/25292 (4 pgs).

Korean IP Office, Written Opinion of the International Searching Authority, dated Jul. 1, 2016 for International Application No. PCT/US16/25292 (8 pgs).

\* cited by examiner

RANDOM ACCESS PROCEDURE FOR BEAM BASED CELL-LESS OPERATION IN 5G RAT

CROSS-REFERENCE TO RELATED APPLICATIONS

This patent application is a U.S. National Phase application under 35 U.S.C. § 371 of International Application No. PCT/US16/25292, filed on 31 Mar. 2016, entitled RANDOM ACCESS PROCEDURE FOR BEAM BASED CELL-LESS OPERATION IN 5G RAT, which claims priority from U.S. patent application Ser. No. 62/216,919, filed on 10 Sep. 2015, entitled Random Access Procedure for Beam Based Cell-Less Operation in 5G RAT.

FIELD

The present description relates to the field of wireless communications and, in particular, to establishing a wireless connection with random access uplink messages.

BACKGROUND

A new 5G radio access technology (RAT), which is envisioned to be operated in both legacy cellular bands and frequency bands above 6 GHz, is likely to exploit advanced Multiple Input Multiple Output (MIMO) (e.g. massive MIMO), Cooperative Multi-point (CoMP) transmission and reception schemes, and multi-connectivity, in order to provide high area traffic capacity and consistent user experience. Narrow beam based system operation with a large number of antennas may increase spectral efficiency by potentially reducing the interference and enabling more users to be spatially multiplexed. Beamforming is a main technology component to enable operation in mid-to-high frequency bands.

In the conventional cellular system, a UE (User Equipment) is typically attempting to connect with a single cell or a single access point (AP) at a time during a random access procedure. After a Radio Resource Control (RRC) connection being established with primary cell (PCell) or master enhanced Nobe B (MeNB)/master cell group (MCG), the UE may be directed by the PCell or MeNB/MCG to further perform some contention free random access with a secondary cell (SCell) or secondary eNB (SeNB) for carrier aggregation or multi-connectivity operation, respectively. These procedures may be applied directly to new 5G RAT technologies for multi-connectivity.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Flexible transmission/reception point switching and multi-point beam aggregation, which may be realized via ideal backhaul based CoMP schemes or non-ideal backhaul based multi-connectivity, would be beneficial to overcome channel blockage in mid/high frequency bands and naturally support seamless mobility. A part of a system framework for beam based cell-less operation is described herein. It is applicable to low/mid/high frequency bands and Time Division Duplex (TDD)/Frequency Division Duplex (FDD) systems.

In a stand-alone ultra-dense high frequency band (e.g. centimeter or millimeter wave) small cell deployment without macro coverage, due to the absence of a macro cell there is no determination of a stable/optimal master eNB whereby the SCells or SCG may be further configured and accessed. As described herein, a random access procedure with multiple APs may be performed simultaneously to determine a suitable PCell/MeNB/MCG during the random access procedure. In one backhaul/front-haul based CoMP scenario where different APs may share the same cell ID, and are therefore considered as a distributed single cell, the UE may keep multiple beam links synchronized with the distributed cell for flexible uplink reception point switching.

Figure 1:
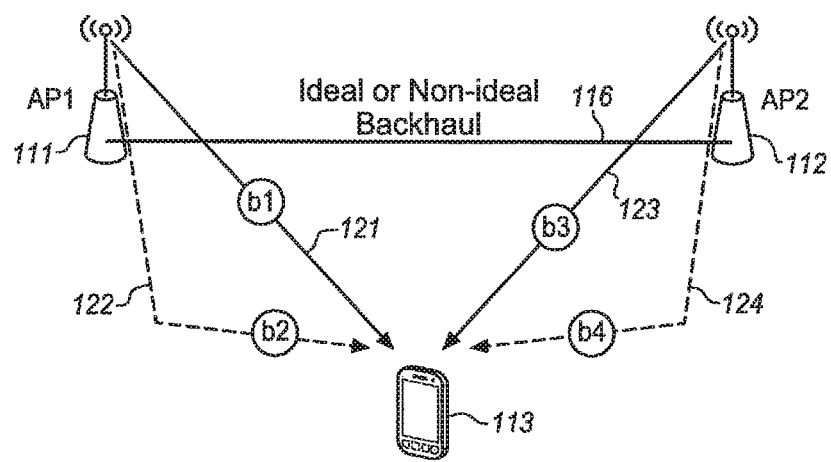
FIG. 1 is a diagram of MIMO communication in a cell-less environment according to an embodiment.

FIG. 1 is a diagram of MIMO communication in a cell-less environment. This may also be considered to be a dense small cell environment. Two access points 111, 112 are in communication with a mobile device 113 through a radio channel 121, 122, 123, 124 that is subject to multipath. The access points are also connected with each other through some separate connection 116 which may be wired or wireless.

As shown in FIG. 1, the two small cells APs 111, 112 are deployed, and connected with an ideal or non-ideal backhaul link 116. Each AP may transmit a number of beam specific reference signals 121, 122, 123, 124 to its coverage area, each of these beam specific reference signals is characterized by a signal sequence in a particular time-frequency radio resources. Each beam has a unique identifier (ID) defined as a beam ID which may be determined by several unique variables. These variables may include a cell ID, a sequence index which may be further a function of cell ID, and a time-frequency resource index etc. As a result, all these beams among different APs are distinguishable or identifiable by the UE.

These beam reference signals may not all be transmitted at the same time, due to the constraints of AP radio frequency (RF) chain capability and targeted beamforming gain or beam coverage. As shown in FIG. 1, if AP1 and AP2 are using different cell IDs, and are connected with a non-ideal backhaul link, four different beams 121, 122, 123, 124 may be received and detected by the UE. For reference, these beams are numbered as b1, b2, b3 and b4.

However, if AP1 and AP2 are configured with the same cell ID, and connected with an ideal-backhaul or fronthaul link, then AP1 and AP2 are perceived by the UE as being a single cell with different antennas. Moreover, if b1 and b3 are transmitted with the same signal sequence using the same time-frequency resources, then they are detected and identified as a single beam reference signal by the UE. In this case, the UE will combine b1 and b3 and perceive the signals as three different beam reference signals, namely b1, b2 and b4.

Introduction

In embodiments herein, random access procedure related processes are disclosed. In particular, physical random access channel (PRACH) radio resource configuration and selection is described for fast uplink (UL) Receive (Rx) beam acquisition, UE-specific preamble format selection, preamble transmission power and timing settings, and random access response (RAR) message and message3 (Msg3) designs are described. These may be used to support the CoMP operation and/or fast multi-connectivity establishment for 5G RAT beam based cell-less operation.

In one example, a UE may perform random access to multiple APs with multiple beams simultaneously. All APs within a cooperation cluster may have common PRACH resources. This allows one preamble to be targeted to multiple APs.

The network configures one PRACH time-frequency radio resource per UL Rx beam group. The UE in turn implicitly indicates potential UL Rx beams or Rx beam directions by selecting a proper PRACH resource, based on DL Tx (Transmit)/Rx beam measurements.

The UE then autonomously selects a PRACH preamble format for each transmitted preamble according to its antenna architecture, its beamforming capability, and its power headroom. The network blindly detects preambles by testing a few allowed preamble formats.

The UE may also determine preamble transmission power such that all the targeted receiving APs may receive preambles with sufficient received power. This is done without the UE violating an uplink power limitation configured at each AP. The targeted APs are selected by the UE using DL beam measurements.

For multi-link uplink synchronization and connection establishment, a RAR (Random Access Response) message may carry multiple timing advance (TA) values. Each TA value may be signaled together with a corresponding UL Rx beam ID, from which the UE may derive a corresponding DL Tx (Downlink Transmit) beam ID and identify a corresponding DL Rx (Downlink Receive) timing.

For cooperative APs connected with non-ideal backhaul links, a UE may receive multiple RAR messages, and respond to each RAR message with a separate Msg3 PUSCH (Physical Uplink Shared Channel) transmission. Each Msg3 may include beam IDs (or associated cell IDs) in all the received RAR messages to inform each AP of the set of serving beams (or cells) for the UE. An idle UE may determine a master AP (or cell) and secondary APs (or cells), by comparing DL beam measurement results for the APs whose RAR messages are successfully received.

In LTE, a PRACH is normally directed to a specific network node. In addition, a random access preamble format is selected specifically for each cell. The format depends on a target cell's coverage, and is broadcasted in a system information block (SIB) or indicated via dedicated RRC (Radio Resource Control) signaling during handover or secondary cell addition.

In some embodiments, excessive preamble sequence repetitions are avoided for UL Rx beam training. This results in more resource-efficient (in terms of radio resources and UE power consumption) acquisition of UL Rx beams. When a UE-specific preamble format is selected by taking into account UE beamforming capability, the UE power consumption is further reduced. Yet the target coverage area is still reached.

The RAR message, carrying multiple TA values and their DL timing references, may expedite multi-link uplink synchronization and enhance timing and frequency tracking performances in the distributed single cell scenario. A new element in the Msg3 of the random access procedure as described herein allows simultaneous multi-connection establishment in a densely deployed low power node network. This works when the network nodes are connected with non-ideal backhaul links.

In the following examples, it is assumed that all APs within a cooperation cluster, which are connected via ideal or non-ideal backhaul links for cooperative transmission and reception, have some common PRACH resources such as time-frequency radio resources and preamble sequences. In addition, the cluster of APs may have the same configurations for other common (i.e. network-specific) layer 1 (L1)/layer 2 (L2) parameters, but this is not necessary. In one embodiment, all the APs within the cluster may have the same cell ID. A UE may acquire DL Rx beams based on PSS/SSS (Primary Synchronization Signal/Secondary Synchronization Signal) detection and DL Tx/Rx beam measurements. A serving cluster may be selected by either the UE or a network. For a RRC connected UE, the network may determine the serving cluster based on the UE's radio resource management (RRM) measurement feedback.

Fast multi-link time, frequency, and spatial synchronization and multi-link establishment may be used to enhance flexible transmission and reception point switching in the data communications described below. As a result, radio link problems such as intermittent connections due to temporal channel blocking may be overcome. To provide this benefit, the UE transmits the preambles to all the APs associated with one or more serving beams. The relevant serving beams are the DL Tx beams received by the UE that satisfy certain received signal quality criteria.

Table 1 shows an example set of physical-layer system parameters, including symbol, sub-frame, and frame durations, which are used below to illustrate an example PRACH transmission structure.

TABLE 1

Example System Parameters

| Parameters | Values |
| --- | --- |
| System bandwidth | 100 MHz |
| FFT size | 2048 |
| Subcarrier frequency spacing | 75 KHz |
| Sample rate | 153.6 MHz |
| Sampling time ($T_s$) | 6.5104 ns |
| Total Number of subcarriers | 1201 (including DC subcarrier) |
| Physical resource block (PRB) | 12 subcarriers, 1 slot (7 OFDM symbols) |
| IDFT/DFT period | 13.333 us |
| Cyclic Prefix duration for a data symbol | 1041.7 ns (=160$T_s$) for block 0 937.5 ns (=144$T_s$) for block 1-6 |
| Number of data OFDM/SC-FDMA symbols per subframe | 14 |
| Subframe duration (TTI) | 200 us (=30720$T_s$) |
| Frame duration ($T_f$) | 2 ms (=307200$T_s$) |

PRACH Resource Configuration and Selection

As described in this example, UL Rx beam acquisition at the APs and reception point selection based on UL Rx beamforming are used for beam based cell-less network operations. This is in part because the APs typically have higher beamforming gains. In mid-to-high frequency bands, both UL Tx and Rx beamforming may be used in order to better ensure a certain coverage. One straightforward way to allow UL Rx beam acquisition is for the UE to transmit repeated preamble sequences for a given UL Tx beam so that one or more APs may receive each preamble sequence with a different set of Rx beams. However, this typically leads to longer preamble transmission times and may result in unnecessary UE power consumption. These negative results attain as only a few UL Rx beams out of all of the tested Rx beams may be suitable for the UE.

If the network configures a PRACH time-frequency radio resource for each UL Rx beam group, then the UE may implicitly indicate potential UL Rx beams or Rx beam directions. This is faster and uses less overhead than when the AP receivers perform blind Rx beam searches. Assuming a certain relationship between a DL Tx beam index and an UL Rx beam index, the UE may select one or more UL Rx beams or beam directions based on DL Tx beam measurements, and further determine one or more beam directions to transmit PRACH preambles according to the acquired DL Tx-Rx beam pairs. One such relationship is reciprocity. The DL Tx beam direction is the same as an UL Rx beam direction for a given beam index. The UL Tx/Rx beams may be the same as DL Rx/Tx beams in TDD systems of calibrated Tx/Rx antennas. For other FDD or TDD systems where the reciprocity of DL/UL spatial propagation parameters such as angle of arrival (AoA) and angle of departure (AoD) may be assumed, DL AoA estimates from the selected DL Tx beam reference signals may be used for selecting UL Tx beams and for the identification of corresponding UL Rx beam directions.

In some embodiments, the network transmits one or more parameters indicating PRACH resource allocation. The parameters may include one or more of a system frame number, a subframe number, a starting PRB number, or any combination of these or more. These may be transmitted in a SIB (System Information Block) or via a dedicated RRC signaling. For a given PRACH radio resource, the APs employ Rx beams of the configured UL Rx beam group to blindly detect received preambles. The UE may further identify one or more UL Rx beam groups and corresponding radio resources for preamble transmission. The relationship between an UL Rx beam index and an UL Rx beam group may be predefined and known to both the network and the UE. If the UE observes changes of the optimal DL Tx beam from one beam to another beam and then may report the update of the optimal beam to the network, then the UE may perform random access in PRACH resources for the updated UL Rx beam groups. Additionally, the network may reconfigure UL sounding reference signal (SRS) resources if the UL Rx beams change.

Figure 2:
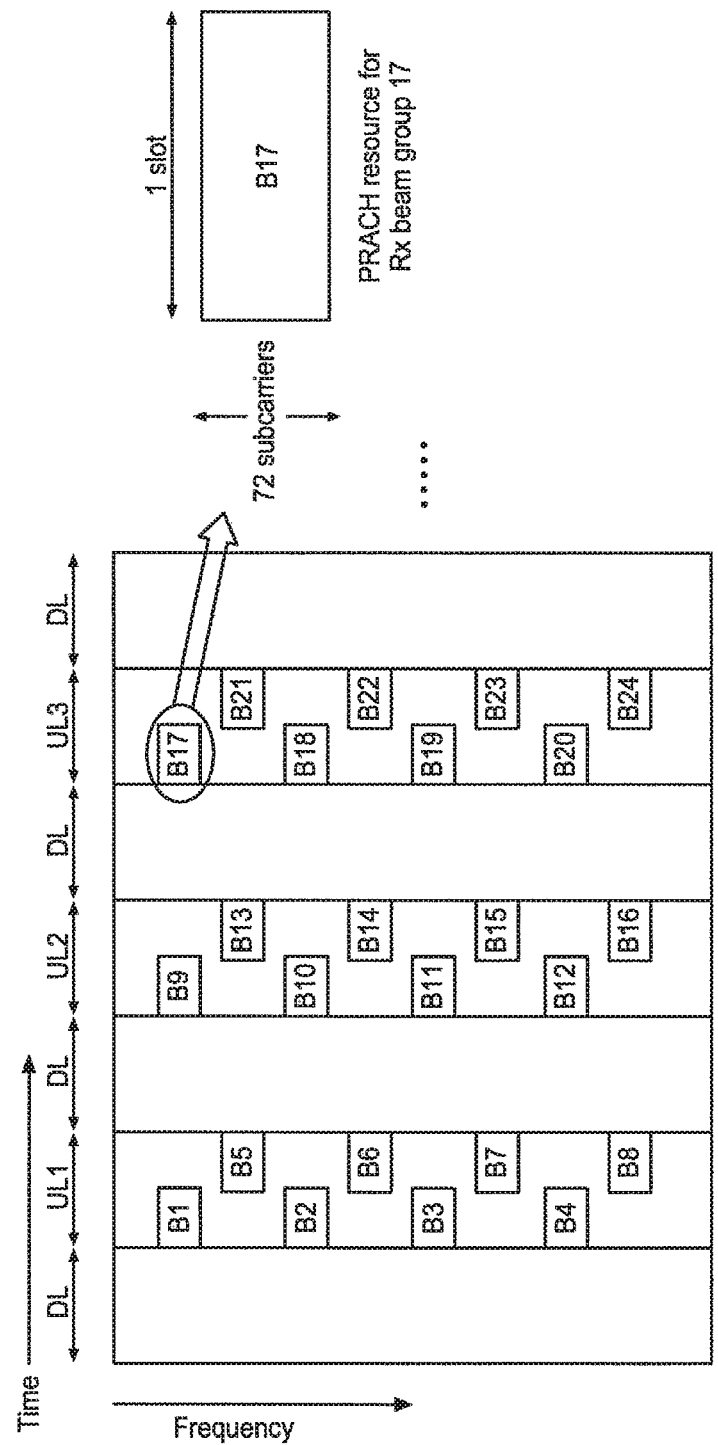
FIG. 2 is a diagram of PRACH radio resources configured over time for different frequencies according to an embodiment.

FIG. 2 is a diagram of PRACH radio resources configured over time on the horizontal axis for different frequencies on the vertical axis. This PRACH radio resource configuration shows 24 UL Rx beam groups, labeled B1 to B24. Each PRACH instance is spanned over 3 UL subframes, UL1, UL2, UL3. The 17$^{th}$ UL Rx beam group, B17, is enlarged as an example to show that each PRACH resource includes 72 subcarriers and spans over one UL slot, i.e. 6 PRBs (Physical Resource Blocks). The subcarrier spacing of a PRACH preamble may be smaller than the normal subcarrier spacing, for example, ½, ¼ or a smaller portion of the regular subcarrier spacing.

Figure 3:
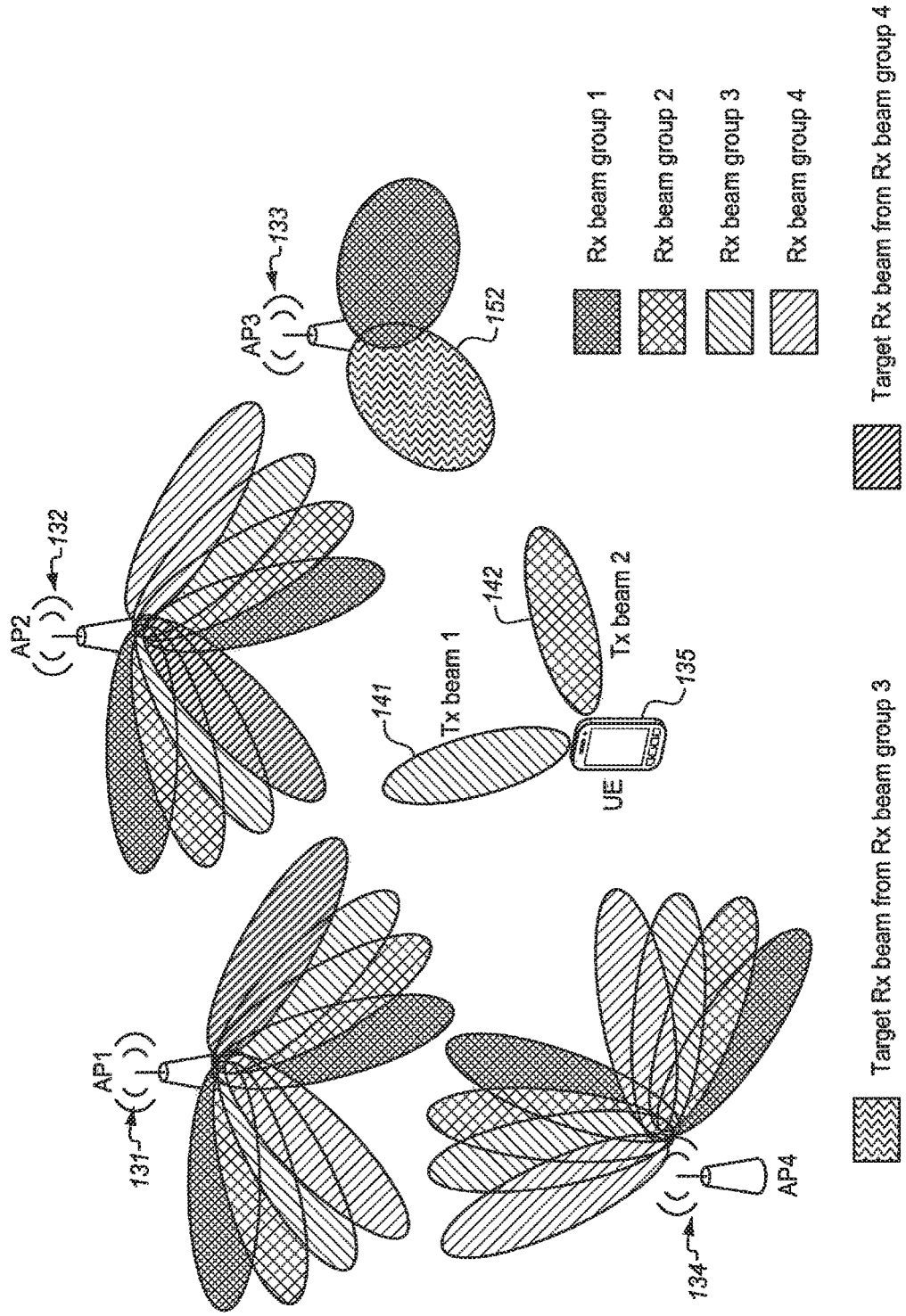
FIG. 3 is another diagram of MIMO communication in a cell-less environment according to an embodiment.

FIG. 3 is a diagram of another cell-less network environment. In this example there are four APs 131, 132, 133, 134 and a single UE 135. The UE sends two transmit beams 141, 142. These two transmit beams illustrate two preamble transmissions, one with Tx beam 1 for Rx beam group 4 targeted to AP1 and AP2, and the other with Tx beam 2 for Rx beam group 3 targeted to AP3. As PRACH resources for Rx beam groups 3 and 4 are located in the same slot, simultaneous transmission of two preambles or sequential transmission is performed within the slot, depending on UE capability and required transmit power.

In one embodiment, if the UE has not obtained the optimal UL Tx beam directions corresponding to selected UL Rx beam groups, the UE may transmit repeated preamble sequences in the PRACH resources of the selected UL Rx beam groups, each sequence with a different set of Tx beam directions.

Preamble Format Selection

In 5G RAT, it may be beneficial that the UE autonomously selects a PRACH preamble format for each transmitted preamble according to its antenna architecture, beamforming capability, and an estimated path loss. Each UE may have different beamforming capabilities and antenna architectures in terms of a beamforming gain, a beam width, the number of RF chains, and the number of Tx beams that the UE may simultaneously transmit without power splitting, e.g. the number of antenna panels (or sub-arrays). Thus, an optimal preamble format may be different for each UE. For example, if the UE has a 12 dB beamforming gain with a 15 degree beam width in the horizontal domain and one RF chain, then only one Tx beam may be transmitted for one preamble sequence duration and accordingly, the maximum 24 sequence repetition may be used in case of sweeping the 360 degree Tx direction. With the same beam width and beamforming gain, if the UE has 2 antenna panels with 2 RF chains, the maximum 12 sequence repetition is used. Furthermore, if the UE has a total of 4 RF chains, i.e. 2 RF chains per antenna panel, and the required preamble transmit power for each Tx beam is small enough to be accommodated by the split power, then a 6 sequence repetition may scan the entire 360 degree direction.

Figure 4:
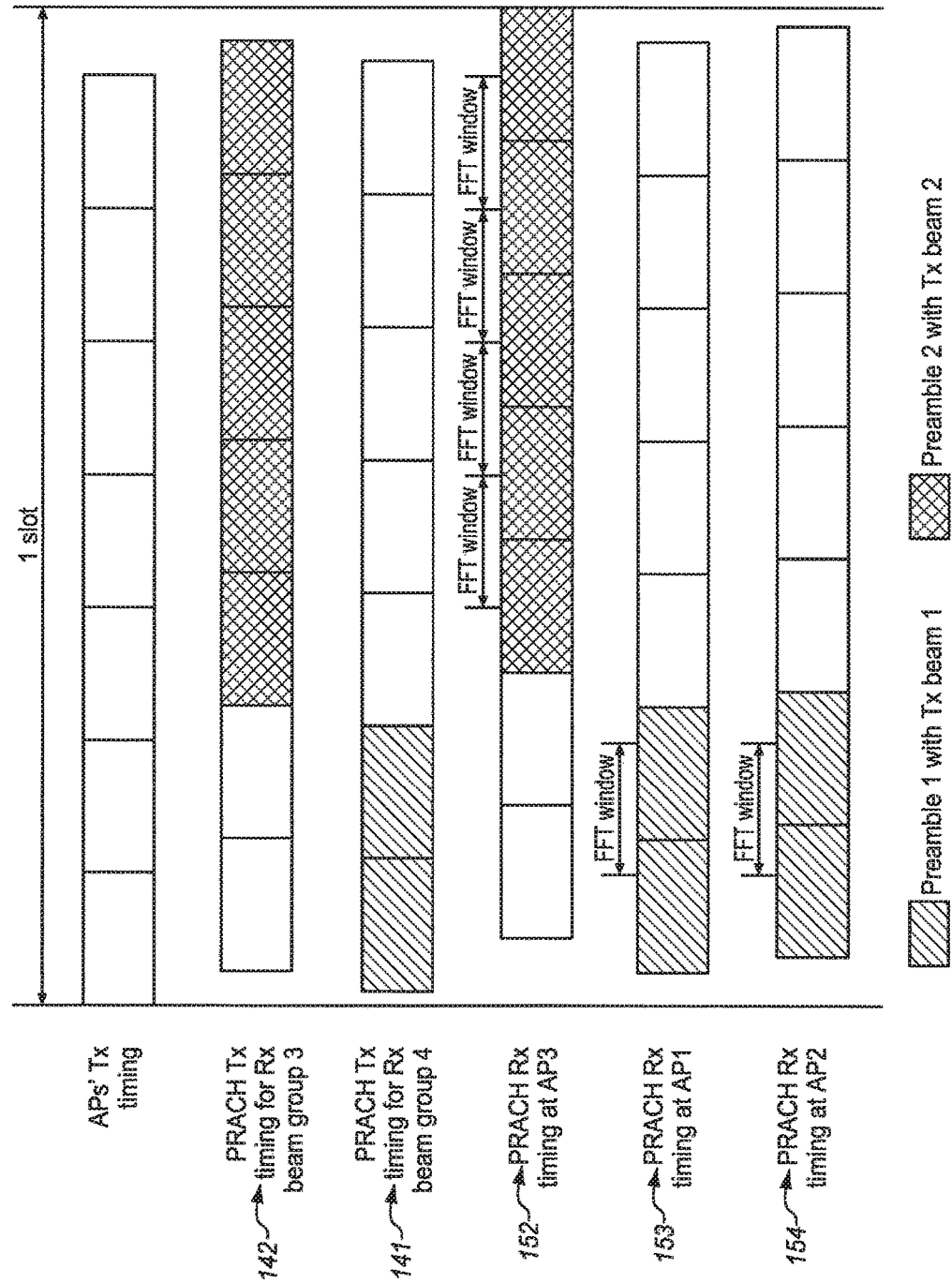
FIG. 4 is a timing diagram of the transmitted signals of FIG. 3 according to an embodiment.

FIG. 4 is a timing diagram of the transmitted signals of FIG. 3. The diagram covers one slot on the horizontal time axis and shows example UE transmissions during that one slot. The first uplink transmit row corresponds to the second transmit beam PRACH 142 from the UE. The second transmit beam corresponds to preamble 2 directed toward AP3 133. The third row 152 corresponds to the first uplink transmit row as received at AP3 133. The preamble 2 is received with some delay.

The second uplink transmit row corresponds to the transmit beam PRACH 141 from the UE to AP1 131 and AP2 132 simultaneously with preamble 1. This signal is received at AP1 in row 153 and AP2 in row 154. As an example the signal is received at AP2 with more delay than at AP1 due to the longer propagation time or greater distance between the UE and the respective AP.

If it is assumed that the UE has acquired DL Rx beams and corresponding UL Tx beam directions, and if the number of prominent UL Tx beam directions for preamble transmission within a given PRACH resource time duration, e.g. 1 slot shown in FIG. 4, is larger than the number of UL Tx beams which the UE may simultaneously transmit, then part or all of the multiple preambles may be sequentially transmitted. Otherwise, all of the preambles may be simultaneously transmitted. In each preamble transmission, the preamble format including a sequence duration and the number of sequence repetitions may be determined by the UE, based on a target preamble receive power, the available transmit power for the given preamble, the path loss estimates from the serving beams associated with the target UL Rx beams, and a UE Tx beamforming gain, among other factors.

In one embodiment, a subset of predefined preamble formats which are suitable for the cooperative AP cluster may be signaled in a SIB, and UE autonomously selects one preamble format out of the broadcast preamble formats for each preamble transmission. The APs blindly detect preamble sequences and preamble formats (e.g. the number of sequence repetitions). In another embodiment, each preamble format is associated with a separate set of preamble sequences, potentially with different sequence lengths. To avoid high complexity on blind detection, the allowed preamble formats may be limited to a few selections, e.g. 1, 4, 6 sequence repetitions.

FIG. 4 shows example PRACH preamble transmissions with the same subcarrier spacing as the data subcarrier spacing, where one symbol (or sequence) duration is used for a cyclic prefix, and 1 and 4 sequence repetitions are used for preamble 1 and preamble 2, respectively. If the common sequence set is applied for different preamble formats, then the UE employs the same sequence for all preamble transmissions within one PRACH instance. If the different sequence sets are configured for the different preamble formats, the UE may select the same preamble sequence index of the different sequence sets for all the preamble transmissions within the PRACH instance.

Preamble Transmission Power and Timing Preamble transmission power $P_{PRACH,j}$ in dBm for UL Tx beam j is determined such that all the targeted receiving APs for UL Tx beam j can receive preambles with sufficient received power, as follows:

$$P_{PRACH,j} = \min\{\min_{a \in A_j} P_{CMAX,a}(i),$$

$$\text{PREAMBLE\_RECEIVED\_TARGET\_POWER} + \max_{b \in B_j} PL_b - G_j^{(UE)}\},$$

where
PREAMBLE_RECEIVED_TARGET_POWER denotes a target preamble received power
$P_{CMAX,a}$ (i) is the configured UE maximum transmit power [1] for subframe i of serving AP a,
$A_j$ is the set of APs associated with $B_j$, where $B_j$ is the set of serving beams associated with UL Tx beam j,
$G_j^{UE}$ is the UE Tx beamforming gain in dB for UL Tx beam j,
$PL_b$ is the downlink path loss estimate calculated in the UE for serving beam b, without taking into account a DL Rx beamforming gain but including a DL Tx beamforming gain which is transparent to the UE, that is, $PL_b = PL_{omni} - G_b^{(AP)}$, where $G_b^{(AP)}$ denotes the DL Tx beamforming gain of the serving beam b.

In one embodiment, a UE Rx beamforming gain for receiving a given serving beam is equivalent to a UE Tx beamforming gain for a preamble transmission associated with the given serving beam. Accordingly, the UE estimates the downlink path loss $PL'_b$ including both the DL Tx and Rx beamforming gains, and the preamble transmission power is set as follows:

$$P_{PRACH,j} = \min\{\min_{a \in A_j} P_{CMAX,a}(i),$$

$$\text{PREAMBLE\_RECEIVED\_TARGET\_POWER} + \max_{b \in B_j} PL'_b\}.$$

In another embodiment, for the given subframe i, $P_{CMAX,a}$ (i) may be the same for all the APs in $A_j$, if all the APs within the serving cluster are configured with the same values for the uplink power limitation P-Max, allowed maximum power reduction (MPR), and additional MPR (A-MPR) parameters.

If a UE transmits a preamble targeted to two or more APs whose DL Rx timings acquired by the UE are different, the UE selects the earliest DL Rx timing as a reference timing for preamble transmission. Furthermore, if the UE transmits multiple preambles sequentially within one PRACH resource time duration, the preamble transmission order is according to the DL Rx timing order.

For example, in FIG. 4, if the UE has the earliest DL Rx timing for serving beams of the AP1 among all serving beams of AP1, AP2, and AP3, the preamble 1 with Tx beam 1 for Rx beam group 4 targeted to AP1 and AP2 is transmitted first, according to the DL Rx timing for the serving beams of AP1. Both AP1 and AP2 compute a relevant UL TA (Uplink Timing Advance) value for the received and detected preamble 1, and signal the TA value (or the TA value index), respectively, either as a separate RAR message or as a combined RAR message. Each TA value is signaled together with a corresponding UL Rx beam ID, from which the UE can derive a corresponding DL Tx beam ID and identify a corresponding DL Rx timing. When the UE applies the signaled TA value, which is associated with the UL Rx beams of AP2, for a following uplink transmission to the AP2, the UE's reference DL timing is the DL Rx timing for AP1. Alternatively, the UE adjusts the signaled TA value, $TA_2$, according to the difference between AP1's Rx timing, $t_{DL,1}$, and AP2's RX timing, $t_{DL,2}$, as follows:

$$TA'_2 = TA_2 + (t_{DL,2} - t_{DL,1})$$

and applies the adjusted TA value $TA'_2$ with respect to the DL Rx timing for AP2.

Figure 5:
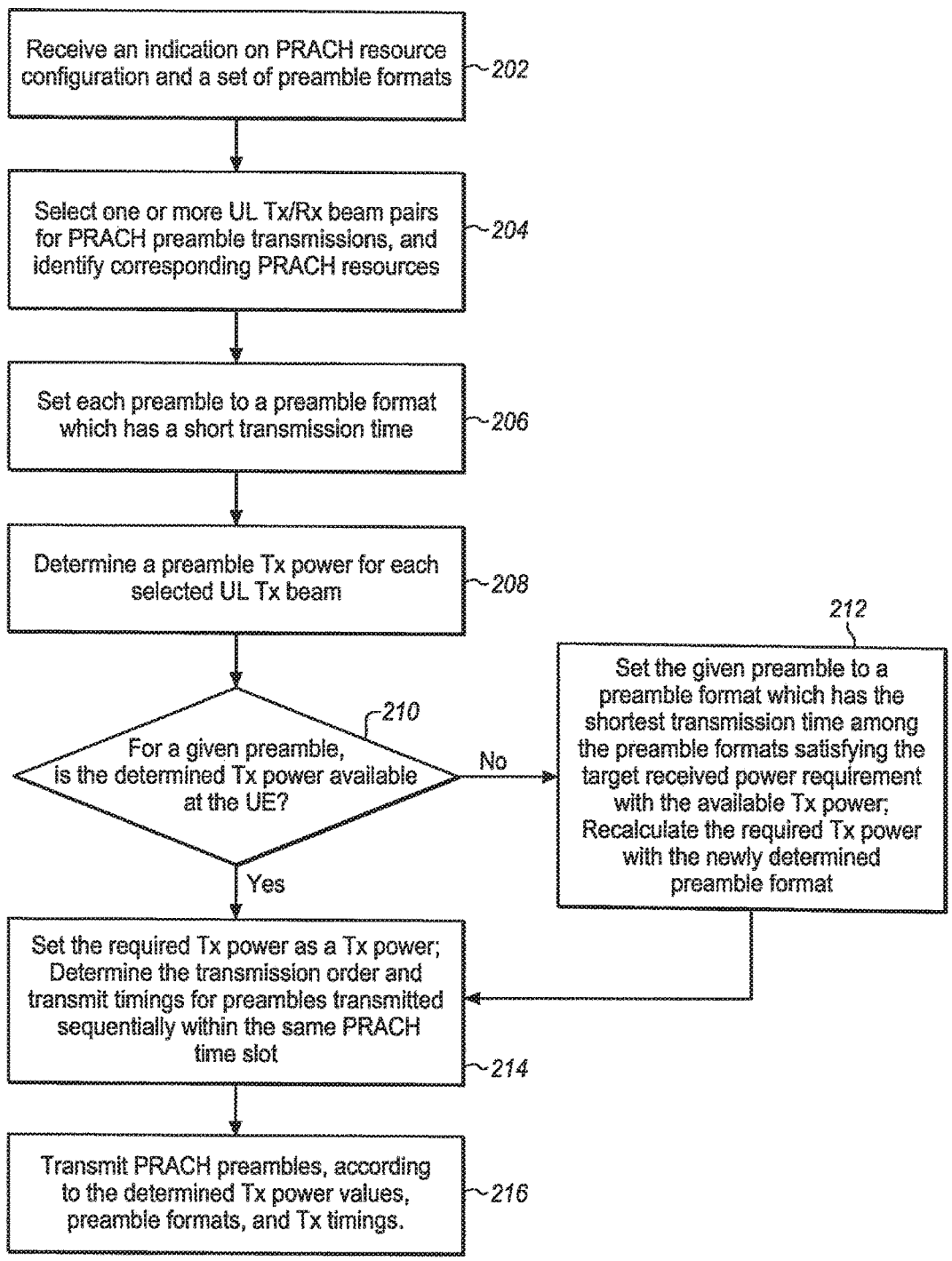
FIG. 5 is a process flow diagram of a PRACH preamble transmission according to an embodiment.

FIG. 5 is a process flow diagram that summarizes a procedure of PRACH preamble transmission, including PRACH resource configuration and selection, preamble format selection, and preamble transmission timing and power setting.

In FIG. 5 at 202, an indication is received regarding a PRACH resource configuration and a set of preamble formats. These are received by a UE from one or more APs. The system may be cell-less as shown or in a cellular system. At 204, the UE selects one or more UL Tx/Rx beam pairs for PRACH preamble transmissions and identifies corresponding PRACH resources for each preamble transmission. This is done based on the received PRACH resource configuration and preamble formats. FIG. 4 shows an example of Tx beams 141, 142 and PRACH resources.

At 206 each preamble is set to a selected preamble format. This may be a preamble format with a particularly short transmission time or another criterion may be used. At 208 a preamble Tx power is determined for each selected UL Tx beam.

At 210 it is determined whether the determined transmit power is available at the UE for a particular or given preamble. If not then the process goes to 212. At 212 the particular preamble is set to a preamble format which has the shortest transmission time among all of the qualifying preamble formats. The qualifying preamble formats are those that satisfy the target received power requirement with the available Tx power. After resetting the preamble format, the required Tx power is recalculated with the newly set preamble format. The process then goes to 214.

If at 210 it is determined that the determined transmit power is available for any given preamble, then the process goes to 214 for that preamble. At 214 the required Tx power is set as a Tx power. The transmission order and transmit timings are determined for all of the preambles that will be sequentially transmitted within a single PRACH time slot as shown for example in FIG. 4.

At 216 the PRACH preambles are transmitted with the Tx power values, preamble formats, and Tx timings determined in the previous operations.

After this transmission, the selected APs are then ready to send RAR messages with TA values so that the UE may complete a multi-link UL synchronization.

Procedure for Multi-link Uplink Synchronization and Connection Establishment

Figure 6:
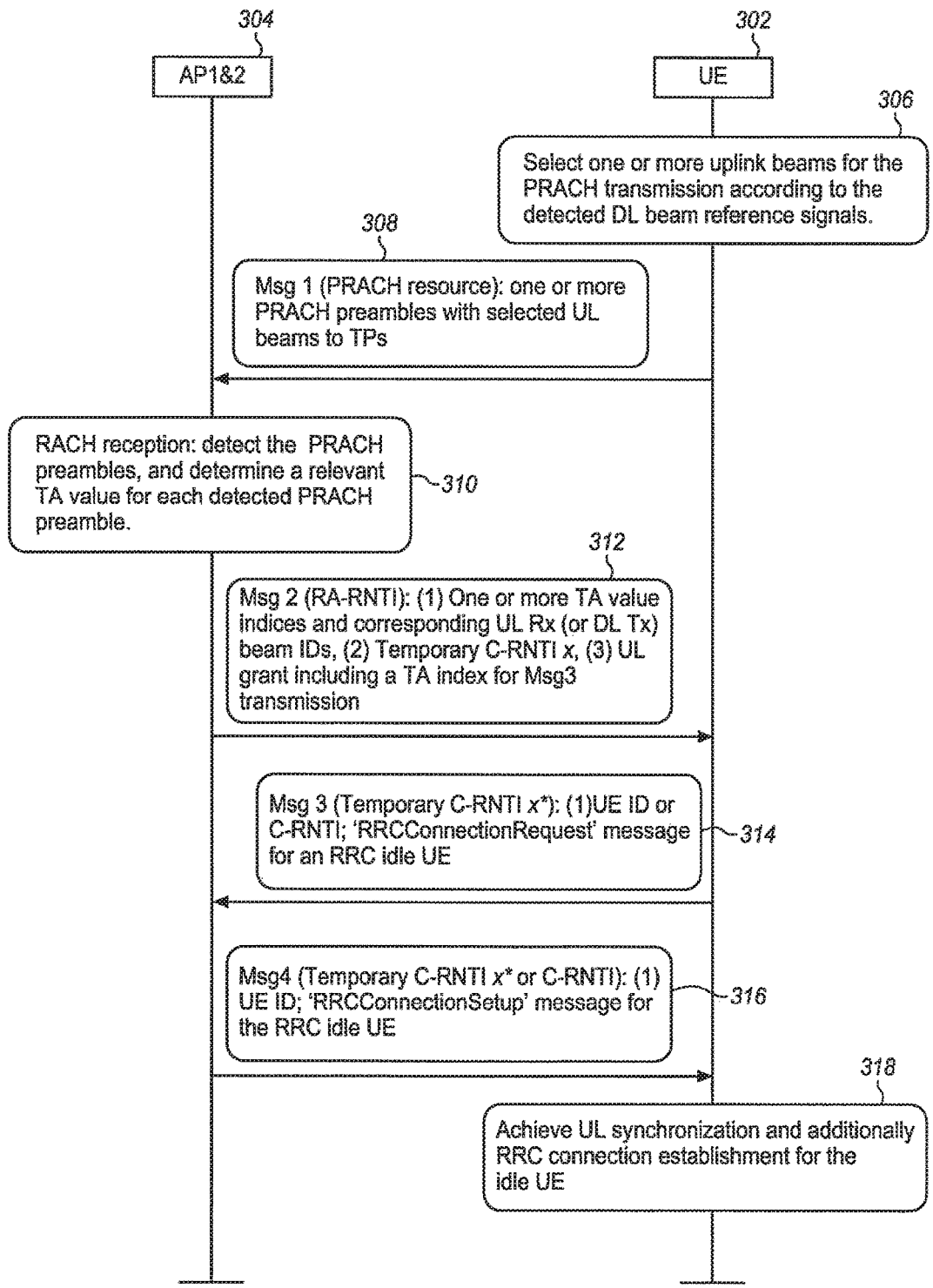
FIG. 6 is a messaging diagram for signals between a UE and multiple APs for PRACH preamble transmission according to an embodiment.
Figure 7:
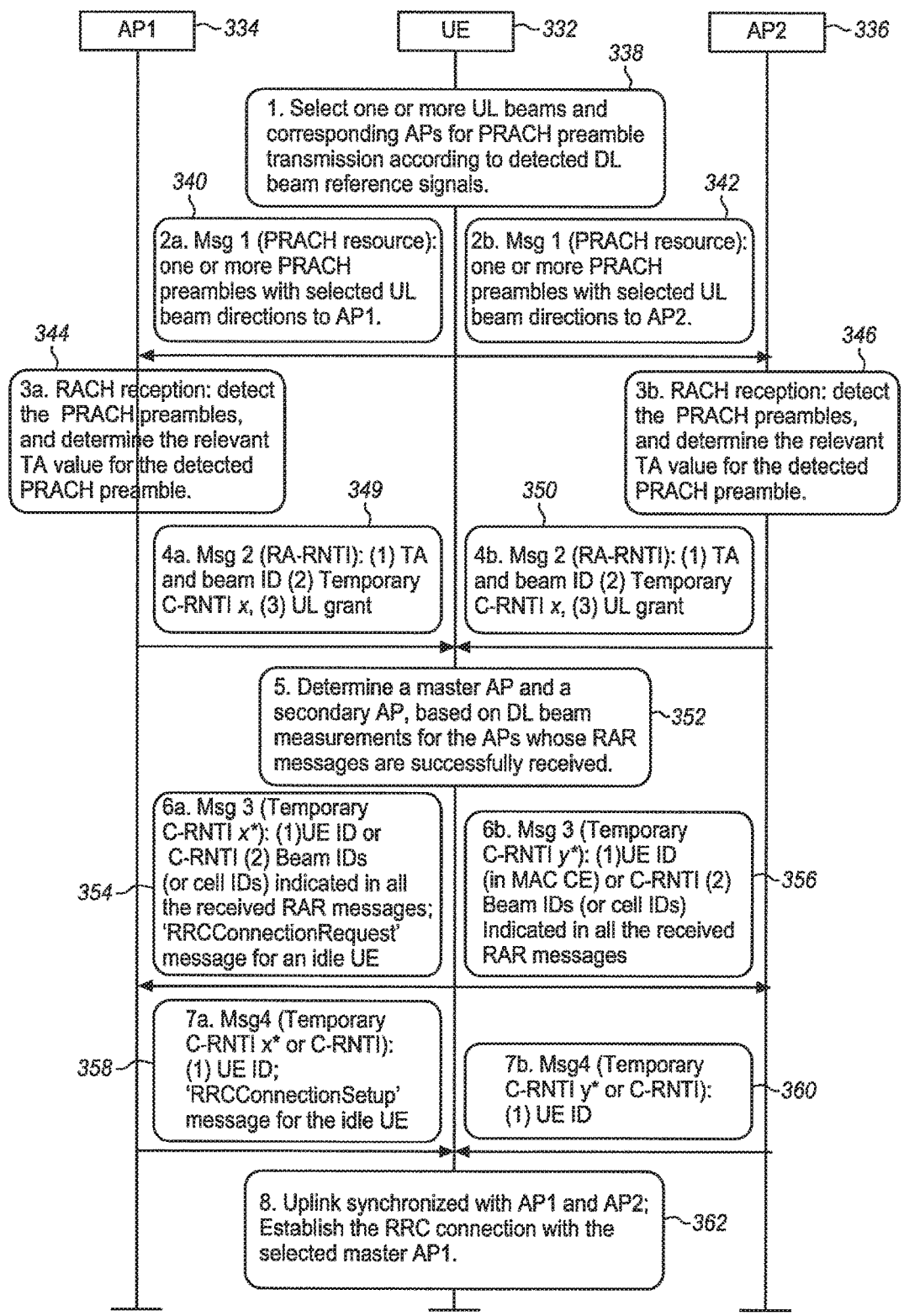
FIG. 7 is another messaging diagram for signals between a UE and multiple APs for PRACH preamble transmission according to an embodiment.

FIGS. 6 and 7 illustrate multi-link uplink synchronization and additionally multi-link connection establishment procedures (for RRC idle UEs) in the deployment scenarios of cooperative APs connected with ideal backhaul links and non-ideal backhaul links, respectively.

FIG. 6 is a messaging diagram for signals between a UE 302 and multiple APs 304. All of the APs are indicated as a single unit in the form of an AP cluster because the transmissions are treated by the UE as if there is a single AP.

To begin the UE receives DL beam reference signals. The UE processes these signals and when it is ready, then at 306 it selects one or more uplink beams for PRACH transmissions according to the detected DL beam reference signals.

At 308 the UE sends a message. This will be referred to as Msg 1, which is addressed with one or more selected PRACH resources. In this message one or more PRACH preambles are sent with selected UL beams to the APs or, in other words, to the AP cluster. The RACH message (Msg 1) is received at the AP cluster and at 310 the AP cluster detects the PRACH preambles. It may then determine a relevant TA value for each detected PRACH preamble.

At 312 the AP cluster returns Msg 2, which is addressed with an RA-RNTI, Random Access Radio Network Temporary Identifier. This message has one or more TA value indices and the corresponding UL Rx (or DL Tx) beam IDs. It also may have temporary C-RNTI x (Cell Radio Network Temporary Identifier x), and an UL grant including a TA index for the Msg3 transmission.

At 314 the UE receives Msg 2. At 316 the UE may respond with Msg 3 which is identified by the APs based on a temporary C-RNTI x*. The message has a UE ID or a C-RNTI; and an 'RRC Connection Request' message for an RRC (Radio Resource Control) idle UE. For successful decoding of Msg 3, the temporary C-RNTI x* should be same as the temporary C-RNTI x with which Msg 3 is addressed.

The AP cluster 304 may then reply to the UE 302 with Msg 4 which is addressed with the temporary C-RNTI x* or C-RNTI. This message may include the UE ID; and an 'RRC Connection Setup' message for the RRC idle UE. After this exchange, at 320 the UE has achieved UL synchronization and an RRC connection establishment for the idle UE.

For the ideal backhaul/front-haul scenario of FIG. 6 in which a single cell ID is assigned to the cooperative AP cluster, the AP cluster sends one RAR message 314 to the UE in response to multiple received and detected preambles 308 of the UE. However, the RAR message 314 may carry multiple TA values (or TA value indices) for one or more APs, and each TA value or its indication may be signaled together with a corresponding UL Rx beam ID or DL Tx beam ID so that the UE can recognize the corresponding DL Rx timing or preamble transmission timing.

In this way, UE may apply a TA value with respect to a proper reference timing for the following uplink transmission 316. Furthermore, the UE can detect potential preamble collision based on the received UL Rx (or DL Tx) beam IDs in the RAR message 314.

If the UE receives an UL Rx beam ID of an Rx beam group which it did not select for PRACH resources, another UE may have used the same preamble sequence on different PRACH resources, or there may be a decoding error. Thus, the UE restarts the random access procedure 308 with a different preamble. In the RAR message 314, the UL grant for message3 PUSCH transmission includes a TA index indicating which TA value is to be applied among all the signaled TA values or a similar indication.

FIG. 7 is a messaging diagram for signals between a UE 332 and two different APs 334, 336. There may be many more APs or multiple AP clusters, depending on the particular implementation. The messaging begins with the UE receiving the DL beam references signals. At 338 the UE selects one or more UL beams and the corresponding APs for the PRACH preamble transmission. The selection is based on the DL beam reference signals that have been detected by the UE. As shown the UE autonomously selects any number of serving APs (cells) from among those which transmit a set of serving beams. The selection is based on DL Tx/Rx beam measurements.

The UE then sends a message to each selected AP or AP cluster. In this example Msg 1 is addressed with one or more selected PRACH resources. It has one or more PRACH preambles with selected UL beam directions sent to AP1 334. The UE also sends a same or similar Msg 1 to AP2 336. This message also has one or more PRACH preambles with selected UL beam directions. The PRACH resources may commonly be configured for all the cooperative APs, although only two are shown.

At 344 AP1 receives the PRACH preambles and detects the PRACH preambles. It then determines the relevant TA value for the detected PRACH preamble and any other appropriate criteria. At 346 AP2 performs the same operations.

At 348 AP1 replies to the UE with Msg 2 which is addressed with an RA-RNTI. The RA-RNTI value may be determined based on time and frequency location of a corresponding PRACH resource. This message (Msg2) includes the TA and beam IDs, a temporary C-RNTI x, and an UL grant. At 350 AP2 sends a similar message Msg 2 which includes its own determinations for these values, namely (1) TA and beam IDs (2) a temporary C-RNTI y, (3) an UL grant.

At 352 the UE receives these messages from each AP. It then determines a master AP and a secondary AP from among all of the APs that responded to the PRACH preambles. The UE determines these based on DL beam measurements for the APs whose RAR messages 348, 350 are successfully received. The UE can determine master and secondary in many different ways using the received multiple RAR messages and other measurements.

The UE is then ready to reply to the APs using the parameters received from the respective AP. Msg 3 354 sent to the selected primary AP, AN, has a UE ID or C-RNTI, beam IDs (or associated cell IDs) indicated in all the received RAR messages, and an 'RRC Connection Request' message for an idle UE. This message is addressed with the temporary C-RNTI x, and a temporary C-RNTI x* used by the AP1 for decoding should be same as the temporary C-RNTI x for successful decoding of Msg 3. Msg 3 356 sent to the secondary AP, AP2, is addressed with the temporary C-RNTI y. This message may have a UE ID in a medium access control control element (MAC CE) or C-RNTI, and the beam IDs (or associated cell IDs) indicated in all the received RAR messages. For successful decoding of this message, a temporary C-RNTI y* used by the AP2 for decoding should be same as the temporary C-RNTI y.

At 354, 356 the UE responds to each RAR message with a separate Msg 3 PUSCH transmission, which includes beam IDs (or associated cell IDs) indicated in all the received RAR messages. For an RRC idle UE, the 'RRC Connection Request' message is only sent to the master AP. For the secondary APs, there is no RRC message, and UE IDs in Msg 3s are sent as a medium access control (MAC) control element.

The APs may then reply to establish the RRC connection. The 'RRC Connection Setup' message is transmitted only from the master AP. At 358 the master AP may reply with Msg4 addressed with the temporary C-RNTI x* or C-RNTI. This message may have the UE ID received in Msg 3 354; and an 'RRC Connection Setup' message for the idle UE. Similarly AP2 336 may reply with Msg 4 addressed with its own temporary C-RNTI y* or C-RNTI. This message may have the UE ID received in Msg 3 356 but no "RRC Connection Setup" because it is the secondary AP, not the master. After this exchange at 362, the UE has an uplink synchronized with AP1 and AP2. In addition, the RRC connection is established with the selected master AP, in this case AP1. A similar approach may be used for more than two APs or AP clusters from which the UE can receive DL beam reference signals.

When the non-ideal backhaul links are used among different APs, multiple RAR messages 348, 350, each of which carries a separate selection of a TA value index, temporary C-RNTI, UL grant, and a beam ID (or a cell ID), are transmitted from multiple APs to the UE via multiple physical data channels. The signaling diagram is illustrated in FIG. 7, and main signaling elements are as follows:

After each AP identifies a set of serving APs for the UE from the beam IDs (or the cell IDs) in the connection request Msg 3's 354, 356, the serving APs are able to coordinate the communications through any available backhaul links. This allows for further configuration on the secondary APs of the UE or reselection of the optimal master AP.

The random access procedures described above creates a single RRC connection with only the master AP. At the same time uplink synchronization is achieved with multiple APs. This process may also be used to create multiple RRC connections by including an 'RRC Connection Request' message in Msg3 to multiple APs, e.g. AP2. This may be used to provide for control plane RRC diversity, for example.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 8:
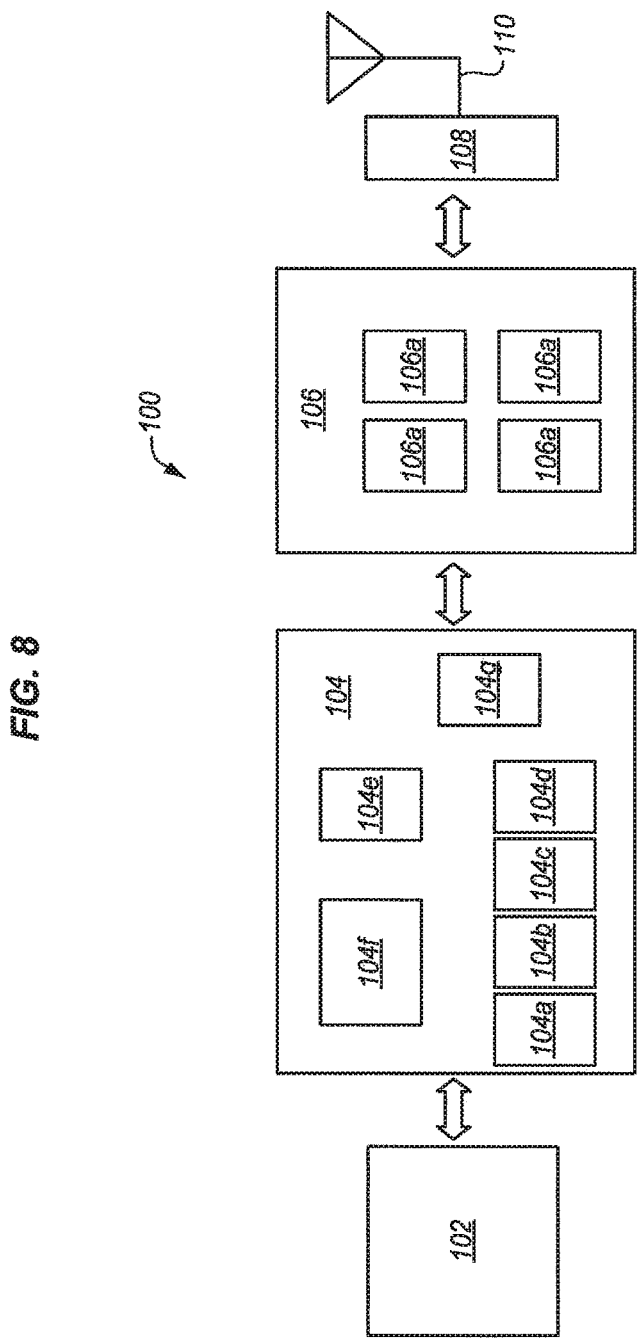
FIG. 8 is a block diagram of an electronic device, such as UE or AP according to an embodiment.

Embodiments described herein may be implemented into a system using any suitably configured hardware and/or software. FIG. 8 illustrates, for one embodiment, example components of an electronic device 100. In embodiments, the electronic device 100 may be, implemented, be incorporated into, or otherwise be a part of a user equipment (UE), an evolved NodeB (eNB), or an Access Point (AP). In some embodiments, the electronic device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor and third generation (3G) baseband processor 104a, fourth generation (4G) baseband processor 104b, and/or other baseband processor(s) 104c for other existing generations, generations in development or to be developed in the future (e.g., fifth generation (5G), 6G, etc.).

The baseband circuitry 104 (e.g., one or more of baseband processors 104a-c) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments.

The baseband circuitry 104 may further include memory/storage 104g. The memory/storage 104g may be used to load and store data and/or instructions for operations performed by the processors of the baseband circuitry 104. The data and instructions may be read by the processors and are stored in a computer-readable format in the memory or storage medium of 704d or in the individual processors or elsewhere to cause the processors to perform the operations described herein. Memory/storage for one embodiment may include any combination of suitable volatile memory and/or non-volatile memory. The memory/storage 104g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 104g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106*d* of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the electronic device 100 may include additional elements such as, for example, memory/storage, display, camera, sensor, and/or input/output (I/O) interface.

In some embodiments where the electronic device 100 is implemented, is incorporated into, or is otherwise part of a UE, the baseband circuitry 104 may be to determine a preamble transmission power, a preamble format, and/or a transmit timing jointly for respective ones of one or more physical random access channel (PRACH) preamble transmissions. The RF circuitry 106 may be to transmit, using the determined preamble transmission power(s), preamble format(s), and/or transmit timing(s), the one or more PRACH preamble transmissions to one or more target access points (APs); and receive, based on the transmitted PRACH preamble transmissions, one or more random access response (RAR) messages with an indication of one or more timing advance (TA) values and/or beams of the one or more target APs.

Figure 9:
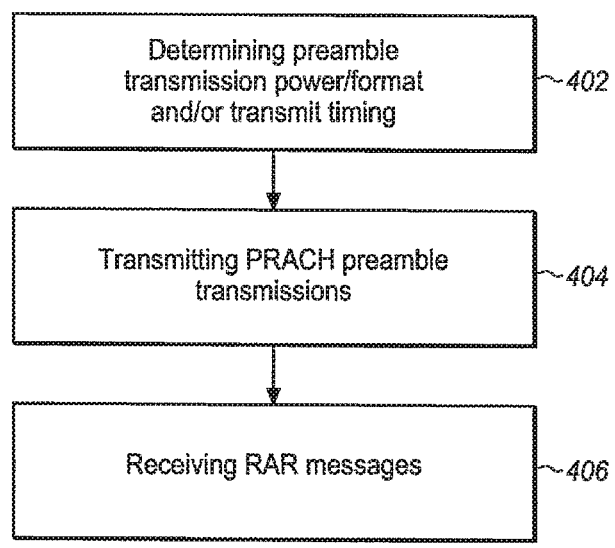
FIG. 9 is a process flow diagram of receiving RAR messages by a UE according to an embodiment.

In some embodiments, the electronic device of FIG. 8 may be configured to perform one or more processes, techniques, and/or methods as described herein, or portions thereof. One such process is depicted in FIG. 9. For example, in embodiments where the electronic device is implemented, is incorporated into, or is otherwise part of a UE, or a portion thereof, the process may include at 402 determining, at a user equipment (UE), a preamble transmission power, a preamble format, and/or a transmit timing jointly for respective ones of one or more physical random access channel (PRACH) preamble transmissions. At 404 the UE, using the determined preamble transmission power(s), preamble format(s), and/or transmit timing(s), transmits the one or more PRACH preamble transmissions to one or more target access points (APs). At 406 the UE, based on the transmitted PRACH preamble transmissions, receives one or more random access response (RAR) messages with an indication of one or more timing advance (TA) values and/or beams of the one or more target APs.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed embodiments. However, it will be apparent to those skilled in the art having the benefit of the present disclosure that the various aspects of the embodiments claimed may be practiced in other examples that depart from these specific details. In certain instances, descriptions of well-known devices, circuits, and methods are omitted so as not to obscure the description of the present embodiments with unnecessary detail.

EXAMPLES

Example 1 may include a method at a User Equipment (UE), comprising receiving an indication on physical random access channel (PRACH) resource configuration and a set of preamble formats, wherein the PRACH resource configuration comprises a distinctive PRACH time-frequency radio resource per uplink receive beam group, selecting one or more uplink transmit and receive beam pairs and corresponding PRACH resources for one or more PRACH preamble transmissions, based on downlink transmit and receive beam measurements, determining a preamble transmission power, a preamble format, and a transmit timing jointly for each of the one or more PRACH preamble transmissions, transmitting the one or more PRACH preambles to one or more target access points (APs) according to the determined transmission powers, preamble formats, and transmit timings, receiving one or more random access response (RAR) messages carrying an indication on one or more timing advance (TA) values and beams of the one or more target APs, which are associated with the one or more TA values, transmitting one or more uplink messages in response to the one or more received RAR messages, and complete multi-link uplink synchronization by successfully receiving one or more contention resolution messages addressed to the UE.

Example 2 may include the method of example 1 or some other example herein, wherein determining the transmit timing comprises determining, based on a UE capability, whether to simultaneously or sequentially transmit PRACH preambles which are assigned to a PRACH time slot, and further determining a transmission order for sequentially transmitted preambles within the PRACH time slot.

Example 3 may include the method of example 2 or some other example herein, wherein determining the transmission order for the sequentially transmitted preambles is based on an order of downlink reference receive timings associated with the sequentially transmitted preambles.

Example 4 may include the method of example 1 or some other example herein, further comprising determining a master AP (or a master AP group) and secondary APs, based on downlink beam measurement results for a subset of the one or more target APs wherein the subset of the one or more target APs detect at least one of the one or more transmitted preambles successfully and their RAR messages are successfully received.

Example 5 may include the method of example 1 or some other example herein, further comprising receiving one combined RAR message which includes the indication on the one or more TA values and the associated beams, and transmitting one uplink response message, when the one or more target APs are connected via ideal backhaul links.

Example 6 may include the method of example 1 or some other example herein, wherein the one or more uplink response messages include an indication on the beams of the one or more target APs received in the one or more RAR messages.

Example 7 may include the method of example 1 or some other example herein, further comprising selecting the preamble format which has the shortest transmission time among a subset of the indicated preamble formats which satisfy a target received power requirement with an available transmit power.

Example 8 may include the method of example 1 or some other example herein, wherein determining the preamble transmission power is based on a UE transmit beamforming gain, path loss estimates for a set of serving beams, and uplink power limitations configured at a subset of the one or more target APs, wherein the set of serving beams are generated by the subset of the one or more target APs.

Example 9 may include a method comprising: determining, at a user equipment (UE), a preamble transmission power, a preamble format, and/or a transmit timing jointly for respective ones of one or more physical random access channel (PRACH) preamble transmissions; transmitting, by the UE using the determined preamble transmission power(s), preamble format(s), and/or transmit timing(s), the one or more PRACH preamble transmissions to one or more target access points (APs); and receiving, by the UE based on the transmitted PRACH preamble transmissions, one or more random access response (RAR) messages with an indication of one or more timing advance (TA) values and/or beams of the one or more target APs.

Example 10 may include the method of example 9 or some other example herein, further comprising: receiving, by the UE, an indication of PRACH resource configuration and/or one or more PRACH preamble formats.

Example 11 may include the method of example 10 or some other example herein, wherein the PRACH resource configuration includes an indication of one or more PRACH time-frequency radio resources related to respective one or more uplink receive beam groups.

Example 12 may include the method of example 10 or some other example herein, further comprising selecting, by the UE based on downlink transmit and/or receive beam measurements, one or more transmit and receive beam pairs and corresponding PRACH resources for the one or more PRACH preamble transmissions.

Example 13 may include the method of example 9 or some other example herein, further comprising transmitting, by the UE, one or more uplink messages based on the one or more RAR messages; and completing, by the UE, multi-link uplink synchronization based on successful receipt of one or more contention resolution messages addressed to the UE.

Example 14 may include the method of example 13 or some other example herein, wherein the one or more uplink messages include an indication of the beams of the one or more target APs received in the one or more RAR messages.

Example 15 may include the method of example 9 or some other example herein, wherein the transmit timing is based on determining, by the UE based on a UE capability, whether to simultaneously or sequentially transmit PRACH preambles which are assigned to a PRACH time slot, and further determining, by the UE, a transmission order for sequentially transmitted preambles within the PRACH time slot.

Example 16 may include the method of example 15 or some other example herein, further comprising determining, by the UE, the transmission order for the sequentially transmitted preambles is based on an order of downlink reference receive timings associated with the sequentially transmitted preambles.

Example 17 may include the method of example 9 or some other example herein, further comprising determining, by the UE, a master AP (or a master AP group) and secondary APs based on downlink beam measurement results for a subset of the one or more target APs wherein the subset of the one or more target APs detect at least one of the one or more transmitted preambles successfully and their RAR messages are successfully received.

Example 18 may include the method of example 9 or some other example herein, further comprising receiving, by the UE, one combined RAR message which includes the indication on the one or more TA values and/or the associated beams; and transmitting, by the UE, one uplink response message, when the one or more target APs are connected via ideal backhaul links.

Example 19 may include the method of example 9 or some other example herein, further comprising selecting the preamble format which has the shortest transmission time among a subset of the indicated preamble formats which satisfy a target received power requirement with an available transmit power.

Example 20 may include the method of example 9 or some other example herein, wherein determining the preamble transmission power is based on one or more of a UE transmit beamforming gain, path loss estimates for a set of serving beams, and uplink power limitations configured at a subset of the one or more target APs, wherein the set of serving beams are generated by the subset of the one or more target APs.

Example 21 may include a user equipment (UE) comprising: baseband circuitry to determine a preamble transmission power, a preamble format, and/or a transmit timing jointly for respective ones of one or more physical random access channel (PRACH) preamble transmissions; and radio frequency (RF) circuitry coupled with the baseband circuitry, the RF circuitry to transmit, using the determined preamble transmission power(s), preamble format(s), and/or transmit timing(s), the one or more PRACH preamble transmissions to one or more target access points (APs); and receive, based on the transmitted PRACH preamble transmissions, one or more random access response (RAR) messages with an indication of one or more timing advance (TA) values and/or beams of the one or more target APs.

Example 22 may include the UE of example 21 or some other example herein, wherein the RF circuitry is further to receive an indication of PRACH resource configuration and/or one or more PRACH preamble formats.

Example 23 may include the UE of example 22 or some other example herein, wherein the PRACH resource configuration includes an indication of one or more PRACH time-frequency radio resources related to respective one or more uplink receive beam groups.

Example 24 may include the UE of example 22 or some other example herein, wherein the baseband circuitry is further to select, based on downlink transmit and/or receive beam measurements, one or more transmit and receive beam pairs and corresponding PRACH resources for the one or more PRACH preamble transmissions.

Example 25 may include the UE of example 21 or some other example herein, wherein the RF circuitry is further to transmit one or more uplink messages based on the one or more RAR messages; and complete multi-link uplink synchronization based on successful receipt of one or more contention resolution messages addressed to the UE.

Example 26 may include the UE of example 25 or some other example herein, wherein the one or more uplink messages include an indication of the beams of the one or more target APs received in the one or more RAR messages.

Example 27 may include the UE of example 21 or some other example herein, wherein the transmit timing is based on a determination, based on a UE capability, whether to simultaneously or sequentially transmit PRACH preambles which are assigned to a PRACH time slot, and a further determination of a transmission order for sequentially transmitted preambles within the PRACH time slot.

Example 28 may include the UE of example 27 or some other example herein, wherein the baseband circuitry is further to determine the transmission order for the sequentially transmitted preambles is based on an order of downlink reference receive timings associated with the sequentially transmitted preambles.

Example 29 may include the UE of example 21 or some other example herein, wherein the baseband circuitry is to further determine a master AP (or a master AP group) and secondary APs based on downlink beam measurement results for a subset of the one or more target APs wherein the subset of the one or more target APs detect at least one of the one or more transmitted preambles successfully and their RAR messages are successfully received.

Example 30 may include the UE of example 21 or some other example herein, wherein the RF circuitry is further to receive one combined RAR message which includes the indication on the one or more TA values and/or the associated beams; and transmit one uplink response message, when the one or more target APs are connected via ideal backhaul links.

Example 31 may include the UE of example 21 or some other example herein, wherein the baseband circuitry is further to select the preamble format which has the shortest transmission time among a subset of the indicated preamble formats which satisfy a target received power requirement with an available transmit power.

Example 32 may include the UE of example 21 or some other example herein, wherein the baseband circuitry is to determine the preamble transmission power is based on one or more of a UE transmit beamforming gain, path loss estimates for a set of serving beams, and uplink power limitations configured at a subset of the one or more target APs, wherein the set of serving beams are generated by the subset of the one or more target APs.

Example 33 may include an evolved NodeB (eNB) comprising baseband circuitry and/or radio frequency (RF) circuitry to generate, process, send, and/or receive any of the messages or indications described in or related to any of examples 1-32.

Example 34 may include a target access point (AP) comprising baseband circuitry and/or radio frequency (RF) circuitry to generate, process, send, and/or receive any of the messages or indications described in or related to any of examples 1-32.

Example 35 may include a method comprising generating, processing, sending, and/or receiving, by an evolved NodeB (eNB), any of the messages or indications described in or related to any of examples 1-32.

Example 36 may include a method comprising generating, processing, sending, and/or receiving, by a target access point (AP), any of the messages or indications described in or related to any of examples 1-32.

Example 37 may include an apparatus comprising means to perform one or more elements of a method described in or related to any of examples 1-36, or any other method or process described herein.

Example 38 may include one or more non-transitory computer-readable media comprising instructions to cause an electronic device, upon execution of the instructions by one or more processors of the electronic device, to perform one or more elements of a method described in or related to any of examples 1-36, or any other method or process described herein.

Example 39 may include an apparatus comprising logic, modules, and/or circuitry to perform one or more elements of a method described in or related to any of examples 1-36, or any other method or process described herein.

Example 40 may include a method, technique, or process as described in or related to any of examples 1-36, or portions or parts thereof.

Example 41 may include a method of communicating in a wireless network as shown and described herein.

Example 42 may include a system for providing wireless communication as shown and described herein.

Example 43 may include a device for providing wireless communication as shown and described herein.

Example 44 relates to one or more computer-readable media having instructions that, when executed, cause a User Equipment (UE) to: determine, at the user equipment (UE), a preamble transmission power, a preamble format, and a transmit timing jointly for respective ones of one or more physical random access channel (PRACH) preamble transmissions; transmit, by the UE using the determined preamble transmission powers, preamble formats, and transmit timing, multiple PRACH preamble transmissions each to a target access points (APs); and receive, by the UE based on the transmitted PRACH preamble transmissions, at least one random access response (RAR) message with an indication of timing advance (TA) values and beams of each target AP.

In Example 45, the subject matter of Example 44 or any of the Examples described herein may further include the UE being further caused to receive, by the UE, an indication of PRACH resource configuration and one or more PRACH preamble formats.

In Example 46, the subject matter of Example 44 or any of the Examples described herein may further include that the PRACH resource configuration includes an indication of one or more PRACH time-frequency radio resources related to respective one or more uplink receive beam groups.

In Example 47, the subject matter of Example 46 or any of the Examples described herein may further include the UE being further caused to select, by the UE one or more transmit and receive beam pairs and corresponding PRACH resources for the one or more PRACH preamble transmissions.

In Example 48, the subject matter of Example 47 or any of the Examples described herein may further include that the transmit and receive beam pairs are selected based on at least one of downlink transmit and receive beam measurements.

In Example 49, the subject matter of Example 44 or any of the Examples described herein may further include the UE being further caused to: transmit, by the UE, one or more uplink messages each based on one of the received RAR messages; and complete, by the UE, multi-link uplink synchronization based on successful receipt of a contention resolution message addressed to the UE.

In Example 50, the subject matter of Example 49 or any of the Examples described herein may further include that each of the one or more uplink messages includes an indication of the beams of the target APs included in the received RAR messages.

In Example 51, the subject matter of Example 50 or any of the Examples described herein may further include that each of the one or more uplink messages includes an indication of the beams of all APs included in any received RAR messages.

In Example 52, the subject matter of Example 44 or any of the Examples described herein may further include that the transmit timing is based on determining, by the UE based on a UE capability, whether to simultaneously or sequentially transmit PRACH preambles which are assigned to a PRACH time slot, and further determining, by the UE, for sequential transmission, a transmission order for sequentially transmitted preambles within the PRACH time slot.

In Example 53, the subject matter of Example 52 or any of the Examples described herein may further include the UE being further caused to determine, by the UE, the transmission order for the sequentially transmitted preambles based on an order of downlink reference receive timings associated with the sequentially transmitted preambles.

In Example 54, the subject matter of Example 44 or any of the Examples described herein may further include the UE being further caused to determine, by the UE, a master AP and secondary APs based on downlink beam measurement results for a subset of the one or more target APs, wherein the subset of the one or more target APs detect at least one of the one or more transmitted preambles successfully and their RAR messages are successfully received.

In Example 55, the subject matter of Example 44 or any of the Examples described herein may further include the UE being further caused to: receive, by the UE, one combined RAR message which includes the indication on the one or more TA values and the associated beams; and transmit, by the UE, one uplink response message, when the one or more target APs are connected via ideal backhaul links.

In Example 56, the subject matter of Example 44 or any of the Examples described herein may further include the UE being further caused to select the preamble format which has the shortest transmission time among a subset of the indicated preamble formats and which satisfy a target received power requirement with an available transmit power.

In Example 57, the subject matter of Example 44 or any of the Examples described herein may further include that determining the preamble transmission power is based on one or more of a UE transmit beamforming gain, path loss estimates for a set of serving beams, and uplink power limitations configured at a subset of the one or more target APs, and wherein the set of serving beams are generated by the subset of the one or more target APs.

Example 58 pertains to baseband circuitry of a user equipment (UE) for obtaining timing advance and beams from multiple access points, the baseband circuitry configured to: determine, at the user equipment (UE), a preamble transmission power, a preamble format, and a transmit timing jointly for respective ones of one or more physical random access channel (PRACH) preamble transmissions; generate, by the UE using the determined preamble transmission powers, preamble formats, and transmit timing, multiple PRACH preamble transmissions each to transmit to a target access points (APs); and process, by the UE based on the transmitted PRACH preamble transmissions, at least one received random access response (RAR) message with an indication of timing advance (TA) values and beams of each target AP.

In Example 59, the subject matter of Example 58 or any of the Examples described herein may further include to process, by the UE, a received indication of PRACH resource configuration and one or more PRACH preamble formats.

In Example 60, the subject matter of Example 58 or any of the Examples described herein may further include that the PRACH resource configuration includes an indication of one or more PRACH time-frequency radio resources related to respective one or more uplink receive beam groups.

Example 61 pertains to a user equipment (UE) comprising: baseband circuitry configured to: determine, at the user equipment (UE), a preamble transmission power, a preamble format, and a transmit timing jointly for respective ones of one or more physical random access channel (PRACH) preamble transmissions; generate, by the UE using the determined preamble transmission powers, preamble formats, and transmit timing, multiple PRACH preamble transmissions each to transmit to a target access points (APs); and process, by the UE based on the transmitted PRACH preamble transmissions, at least one received random access response (RAR) message with an indication of timing advance (TA) values and beams of each target AP; and radio frequency circuitry with a receive signal path coupled to the baseband circuitry and to an antenna to send the preamble transmissions and to receive the random access response message.

In Example 62, the subject matter of Example 61 or any of the Examples described herein may further include that the transmit timing is based on determining, by the UE based on a UE capability, whether to simultaneously or sequentially transmit PRACH preambles which are assigned to a PRACH time slot, and further determining, by the UE, for sequential transmission, a transmission order for sequentially transmitted preambles within the PRACH time slot.

In Example 63, the subject matter of Example 61 or any of the Examples described herein may further include that determining the preamble transmission power is based on one or more of a UE transmit beamforming gain, path loss estimates for a set of serving beams, and uplink power limitations configured at a subset of the one or more target APs, and wherein the set of serving beams are generated by the subset of the one or more target APs.

Example 64 pertains to an apparatus with means for performing functions of any one or more of the Examples described herein.

The foregoing description of one or more implementations provides illustration and description, but is not intended to be exhaustive or to limit the scope of the embodiments to the precise form disclosed. Modifications and variations are possible in light of the above teachings or may be acquired from practice of various implementations of the embodiments.

The invention claimed is:

1. One or more non-transitory computer-readable media having instructions stored thereon that, when executed by a processor, cause a User Equipment (UE) coupled to the processor to:
    determine, at the user equipment (UE), a preamble transmission power, a preamble format, and a transmit timing jointly for respective ones of one or more physical random access channel (PRACH) preamble transmissions;
    transmit, by the UE using the determined preamble transmission powers, preamble formats, and transmit timing, multiple PRACH preamble transmissions each to a target access points (APs); and
    receive, by the UE based on the transmitted PRACH preamble transmissions, at least one random access response (RAR) message with an indication of timing advance (TA) values and beams of each target AP, wherein the preamble transmission power is determined based on the UE transmit beamforming gain, path loss estimates for a set of serving beams that are generated by a subset of the one or more target APs and uplink power limitations configured at the subset of the one or more target APs.

2. The media of claim 1, the UE being further caused to receive, by the UE, an indication of PRACH resource configuration and one or more PRACH preamble formats.

3. The media of claim 2, wherein the PRACH resource configuration includes an indication of one or more PRACH time-frequency radio resources related to respective one or more uplink receive beam groups.

4. The media of claim 2, the UE being further caused to select, by the UE one or more transmit and receive beam pairs and corresponding PRACH resources for the one or more PRACH preamble transmissions.

5. The media of claim 4, wherein the transmit and receive beam pairs are selected based on at least one of downlink transmit and receive beam measurements.

6. The media of claim 1, the UE being further caused to:
    transmit, by the UE, one or more uplink messages each based on one of the received RAR messages; and
    complete, by the UE, multi-link uplink synchronization based on successful receipt of a contention resolution message addressed to the UE.

7. The media of claim 6, wherein each of the one or more uplink messages includes an indication of the beams of the target APs included in the received RAR messages.

8. The media of claim 6, wherein each of the one or more uplink messages includes an indication of the beams of all APs included in any received RAR, messages.

9. The media of claim 1, Wherein the transmit timing is based on determining, by the UE based on a UE capability, whether to simultaneously or sequentially transmit PRACH preambles which are assigned to a PRACH time slot, and further determining, by the UE, for sequential transmission, a transmission order for sequentially transmitted preambles within the PR ACH time slot.

10. The media of claim 9, the UE being, further caused to determine, by the UE, the transmission order the sequentially transmitted preambles based on an order of downlink reference receive timings associated with the sequentially transmitted preambles.

11. The media of claim 1, the UE being further caused to determine, by the UE, a master AP and secondary APs based on downlink beam measurement results for a subset of the one or more target APs, wherein the subset of the one or more target APs detect at least one of the one or more transmitted preambles successfully and their RAR messages are successfully received.

12. The media of claim 1, the UE being further caused to:
    receive, by the UE one combined RAR message which includes the indication on the one or more TA values and the associated beams; and
    transmit, by the UE, one uplink response message, when the one or more target APs are connected via ideal backhaullinks.

13. The media of claim 1, the UE being further caused to select the preamble format which has the shortest transmission time among a subset of the indicated preamble formats and which satisfy a target received power requirement with an available transmit power.

14. Baseband circuitry of a user equipment (UE) for obtaining timing advance values and beams from multiple access points, the baseband circuitry configured to:
    determine, at the user equipment (UE), a preamble transmission power, a preamble format, and a transmit timing jointly for respective ones of one or more physical random access channel (PRACH) preamble transmissions;
    generate, by the UE using the determined preamble transmission powers, preamble formats, and transmit timing, multiple PRACH preamble transmissions each to transmit to a target access points (APs); and
    process, by the UE based on the transmitted PRACH preamble transmissions, at least one received random access response (RAR) message with an indication of timing advance (TA) values and beams of each target AP, wherein the preamble transmission power is determined based on the UE transmit beamforming gain and path loss estimates for a set of serving beams that are generated by the sunset of the Aps, and uplink power limitations configured at the subset of the target APs.

15. The baseband circuitry of claim 14 further configured to process, by the UE, a received indication of PRACH resource configuration and one or more PRACH preamble formats.

16. Me baseband circuitry of claim 14, wherein the PRACH resource configuration includes an indication of one or more PRACH time-frequency radio resources related to respective one or more uplink receive beam groups.

17. A user equipment (YE) comprising: baseband circuity configured to:
    determine, at the user equipment (UF), a preamble transmission power, a preamble format, and a transmit timing jointly for respective ones of one or more physical random access channel (PRACH) preamble transmissions;

generate, by the UE using the determined preamble transmission powers, preamble formats, and transmit timing, multiple PRACH preamble transmissions each to transmit to a. target access points (APs); and process, by the UP based on the transmitted PRACH preamble transmissions, at least one received random access response (RAR) message with an indication of timing advance (TA) values and beams of each target AP; and radio frequency circuitry with a receive signal path coupled to the baseband circuitry and to an antenna to send the preamble transmissions and to receive the random access response message), wherein the preamble transmission power is determined based on the UE transmit beamforming gain, path loss estimates for a set of serving beams that are generated by a subset of the target Aps and uplink power limitation configured at the subset of the target Aps.

18. The UE of claim 17, wherein the transmit timing is based on determining, by the UE based on a UE capability, whether to simultaneously or sequentially transmit PRACH preambles which are assigned to a PRACH time slot, and further determining, by the UE, for sequential transmission, a transmission order for sequentially transmitted preambles within the PRACH time slot.

* * * * *